United States Patent [19]
Sato et al.

[11] Patent Number: 5,574,932
[45] Date of Patent: Nov. 12, 1996

[54] ONE-CHIP MICROCOMPUTER AND PROGRAM DEVELOPMENT/EVALUATION SYSTEM THEREFOR

[75] Inventors: Fumiki Sato; Kouichi Fujita, both of Itami, Japan

[73] Assignee: Mitsubishi Denki Kabushiki Kaisha, Tokyo, Japan

[21] Appl. No.: 318,455

[22] Filed: Oct. 5, 1994

[30] Foreign Application Priority Data

Oct. 12, 1993 [JP] Japan .................................. 5-254270

[51] Int. Cl.$^6$ ...................................................... G06F 9/00
[52] U.S. Cl. ........................... 395/800; 364/243; 364/267; 364/267.91; 364/249.2; 364/DIG. 1; 395/500
[58] Field of Search ...................... 395/800, 500; 371/16.1

[56] References Cited

U.S. PATENT DOCUMENTS

| | | | |
|---|---|---|---|
| 4,580,216 | 4/1986 | Bellay | 395/800 |
| 4,670,838 | 6/1987 | Kawata | 395/375 |
| 4,811,345 | 3/1989 | Johnson | 395/183.03 |
| 5,021,996 | 6/1991 | Watanabe | 395/800 |
| 5,089,951 | 2/1992 | Iijima | 395/275 |

*Primary Examiner*—Eric Coleman
*Attorney, Agent, or Firm*—Lowe, Price, LeBlanc & Becker

[57] ABSTRACT

A one-chip microcomputer having a mode setting circuit 40a in a first MCU 1a and a second MCU 1b for setting either a first evaluation operation mode under which the operations of memory 3a stops and programs and data are read from the outside via terminals 7a, 8a and 9a of a first peripheral device 41a in order to operate a CPU 2a or a second evaluation operation mode under which an operation of the CPU 2a stops and signals are input/output from/to the outside via terminals 12a, 13a, and 14a of a second peripheral device 42a in order to control the first peripheral device 41a, wherein the terminals 7a, 8a and 9a of the first peripheral device 41a of the first MCU 1a are connected to the terminals 12a, 13a and 14a of the second peripheral device 42b of the second MCU 1b and a debug ROM 11. The number of external terminals necessary for program development and evaluation can be decreased and exterior peripheral devices are not needed for program development and evaluation.

6 Claims, 5 Drawing Sheets

ONE-CHIP MICROCOMPUTER AND PROGRAM DEVELOPMENT/EVALUATION SYSTEM THEREFOR

BACKGROUND OF THE INVENTION

1. Field of the Invention

The present invention is related to a one-chip microcomputer which can be evaluated easily in software development stages.

2. Description of the Related Art

FIG. 1 is a schematic diagram showing a system configuration when developing software for a one-chip microcomputer by the conventional technique for controlling the other devices.

In FIG. 1, reference numeral 1 indicates a one-chip microcomputer (MCU) and reference numerals 2 to 5 indicate the components thereof respectively.

Concretely, reference numeral 2 indicates a CPU executing a program, reference numeral 3 indicates a memory storing the program, reference numeral 4 indicates a peripheral device such as an A/D converter or a timer, and reference numeral 5 indicates an input/output port which inputs/outputs signals from/to the outside. Reference numeral 30 indicates an internal bus (including an address bus, a data bus and a control signal line) which connect the CPU 2, the memory 3, the peripheral device 4 and the input/output port 5 to each other in the one-chip microcomputer 1.

Normally (in the normal operation mode described later), peripheral device 4 and the input/output port 5 are connected to the pertinent portions of the other devices controlled by the one-chip microcomputer 1.

Since the program and data of the one-chip microcomputer 1 are stored in the memory 3, one-chip microcomputer 1 has an evaluation operation mode which is different from the normal operation mode for development and evaluation of programs while operating the devices to be controlled whereto one-chip microcomputer 1 is connected. In addition, the normal operation mode of the one-chip microcomputer 1 is that the CPU 2 is operated by the program and data stored in the memory 3 of the one-chip microcomputer 1 and the operations thereof cannot be seen from the outside of the one-chip microcomputer 1.

Reference numeral 40 is a mode setting circuit which switches the above stated operation modes. In response to a mode signal MODE inputted to the mode setting circuit 40, the one-chip microcomputer 1 operates in either the above mentioned normal operation mode or the evaluation operation mode. Concretely, when the mode signal MODE is inputted via the mode control terminal 6, the mode setting circuit 40, according to the specified mode, outputs a signal to each component of the one-chip microcomputer 1 to stop or operate them.

When the normal operation mode is set, the node setting circuit 40 operates all the components of the one-chip microcomputer 1. However, when the evaluation operation mode is set, the mode setting circuit 40 inhibits operations of the memory 3 and the input/output port 5 of the one-chip microcomputer 1 and operates the CPU 2 and the peripheral device 4. In this case, the CPU 2 operates by reading the programs from the outside.

In FIG. 1, reference numerals 7, 8 and 9 are input/output terminals of the input/output port 5. When the normal operation mode is set to the one-chip microcomputer 1, input/output terminals 7, 8 and 9 function as the input/output terminals of the input/output port 5, when the operation mode is set to the one-chip microcomputer 1, they function as terminals for connecting the internal bus 30 to the external devices. In the latter case, an address terminal 7 is connected to the internal address bus of the one-chip microcomputer 1, and a data terminal 8 is connected to the internal data bus, and a control terminal 9 is connected to a control signal such as an R/W, a φ (clock), etc.

Reference numeral 10 is an exterior port. The exterior port 10 is provided to compensate for the input/output port 5 which is prohibited when the evaluation operation mode is set to the one-chip microcomputer 1 and is connected to the input/output terminals 7, 8 and 9 of the one-chip microcomputer 1 via signal lines 31, 32 and 33, respectively. The exterior port 10 is controlled as the input/output port 5 by the CPU 2 in the one-chip microcomputer 1 from the address terminal 7, the data terminal 8 and the control terminal 9 via the signal lines 31, 32 and 33, respectively, with the same address in the case where the input/output port 5 operates under the normal operation mode.

Reference numeral 11 is a debug ROM. The ROM 11 is provided to compensate for the memory 3 which is prohibited when the evaluation operation mode is set to the one-chip microcomputer 1 and is connected to the input/output terminals 7, 8 and 9 of the one-chip microcomputer 1 via the signal lines 31, 32 and 33, respectively. The debug ROM 11 is handled as the memory 3 under the normal operation mode by the CPU 2 in the one-chip microcomputer 1 from the address terminal 7, the data terminal 8 and the control terminal 9 via the signal lines 31, 32 and 33 with the same address in the case where the memory 3 operates in the same manner as exterior port 10.

The system comprising the one-chip microcomputer 1, the exterior port 10 and the debug ROM 11 is equivalent to the one-chip microcomputer 1 under the normal operation mode for the devices to be controlled when the evaluation operation mode under which the memory 3 and the input/output port 5 in the one-chip microcomputer 1 do not operate is set.

Consequently, the contents of the debug ROM 11 can be rewritten at any time and the operations of the CPU 2 can be detected by the status of the signal lines 31, 32 and 33 connected to the input/output terminals 7, 8 and 9, therefore the program can be developed and evaluated while operating the devices to be controlled when the one-chip microcomputer 1 operates under the evaluation operation mode.

As stated above, the programs and data are supplied from the outside when the evaluation operation mode is set in the one-chip microcomputer by the conventional technique. However, provision for peripheral devices at the outside is difficult in the aspects of technique and cost, therefore the terminals for connecting the internal buses of the one-chip microcomputer to the outside are commonly used as the input/output terminals of the input/output port of simple functions.

This means that the same number of external terminals as that of internal buses of the one-chip microcomputer is necessary. Consequently, the number of terminals allocated to the peripheral devices is insufficient, and the peripheral devices which should be able to be built in cannot be built in.

SUMMARY OF THE INVENTION

The above problem becomes grave as the performance of the CPU in the one-chip microcomputer is improved and the number of bits of internal buses increases. Primary object of the present invention is to solve the problem.

The other object of the invention is to provide program development/evaluation system for the one-chip microcomputer wherein the above problem is solved.

A one-chip microcomputer related to the present invention comprises storing means for storing programs and data, a CPU for executing the programs stored in the storing means, a first peripheral device having terminals connected to the outside, a second peripheral device having terminals connected to the outside, and operation mode setting means for setting either a first evaluation operation mode under which an operation of the storing means stops and the programs or data are read from the outside via the terminals of the first peripheral device in order to operate the CPU or a second evaluation operation mode under which an operation of the CPU stops and signals are inputted/outputted from/to the outside via the terminals of the second peripheral device in order to control the first peripheral device.

A program development/evaluation system for a one-chip microcomputer related to the present invention comprises two above stated one-chip microcomputers, wherein the terminals of the first peripheral device of a first one-chip microcomputer for which the first evaluation operation mode is set are connected to those of the second peripheral device of a second one-chip microcomputer for which the second evaluation operation mode is set.

A one-chip microcomputer related to the present invention comprises a storing means for storing programs and data, a CPU for executing the programs stored in the storing means, several peripheral devices each having terminals connected to the outside, and operation mode setting means for setting either a first evaluation operation mode under which an operation of the storing means stops and the programs or data are read from the outside via the terminals of some of said several peripheral devices in order to operate the CPU, or one or more second evaluation operation modes under which an operation of the CPU stops and, in order to control one peripheral device among said some of several part of peripheral devices, signals are inputted/outputted from/to the outside via the terminals of some of several peripheral devices except for the one peripheral device.

A program development/evaluation system for the one-chip microcomputer related to the present invention uses a plurality of the above stated one-chip microcomputers, wherein the terminals of a part of peripheral devices of the first one-chip microcomputer for which the first evaluation operation mode is set are connected to those of peripheral devices except for one peripheral device of the second one-chip microcomputers for which second evaluation operation mode is set, and program supplying means is connected to the terminals of the part of peripheral devices of the first one-chip microcomputer.

In the one-chip microcomputer related to the present invention, an operation of the storing means stops and programs or data are read from the outside via the terminals of the first peripheral device in order to operate the CPU under the first evaluation operation mode, and an operation of the CPU stops and signals are inputted/outputted from/to the outside via the terminals of the second peripheral device in order to control the first peripheral device under the second evaluation operation mode.

In the program development/evaluation system of the one-chip microcomputer related to the present invention, a computer system comprises the CPU and the second peripheral device of the first one-chip microcomputer, the first peripheral device of the second one-chip microcomputer, and the program supplying means.

Further, in the one-chip microcomputer related to the present invention, an operation of the storing means stops and programs or data are read from the outside via the terminals of some of several peripheral devices in order to operate the CPU under the normal operation mode, and the operation of the CPU stops and signals are inputted/outputted via the terminals of some of several peripheral devices except for one peripheral device in order to control the one peripheral devices under the second evaluation operation mode.

Further, in the program development/evaluation system of the one-chip microcomputer related to the present invention, a computer system comprises the CPU and some or all of peripheral devices except for some peripheral devices of the first one-chip microcomputer, some or all of peripheral devices which are not connected to the first one-chip microcomputer of the second one-chip microcomputers, and the program supplying means.

The above and further objects and features of the invention will more fully be apparent from the following detailed description with accompanying drawings.

DESCRIPTION OF THE PREFERRED EMBODIMENT

The present invention is described with reference to the drawings illustrating the examples of the embodiments thereof.

Figure 1:
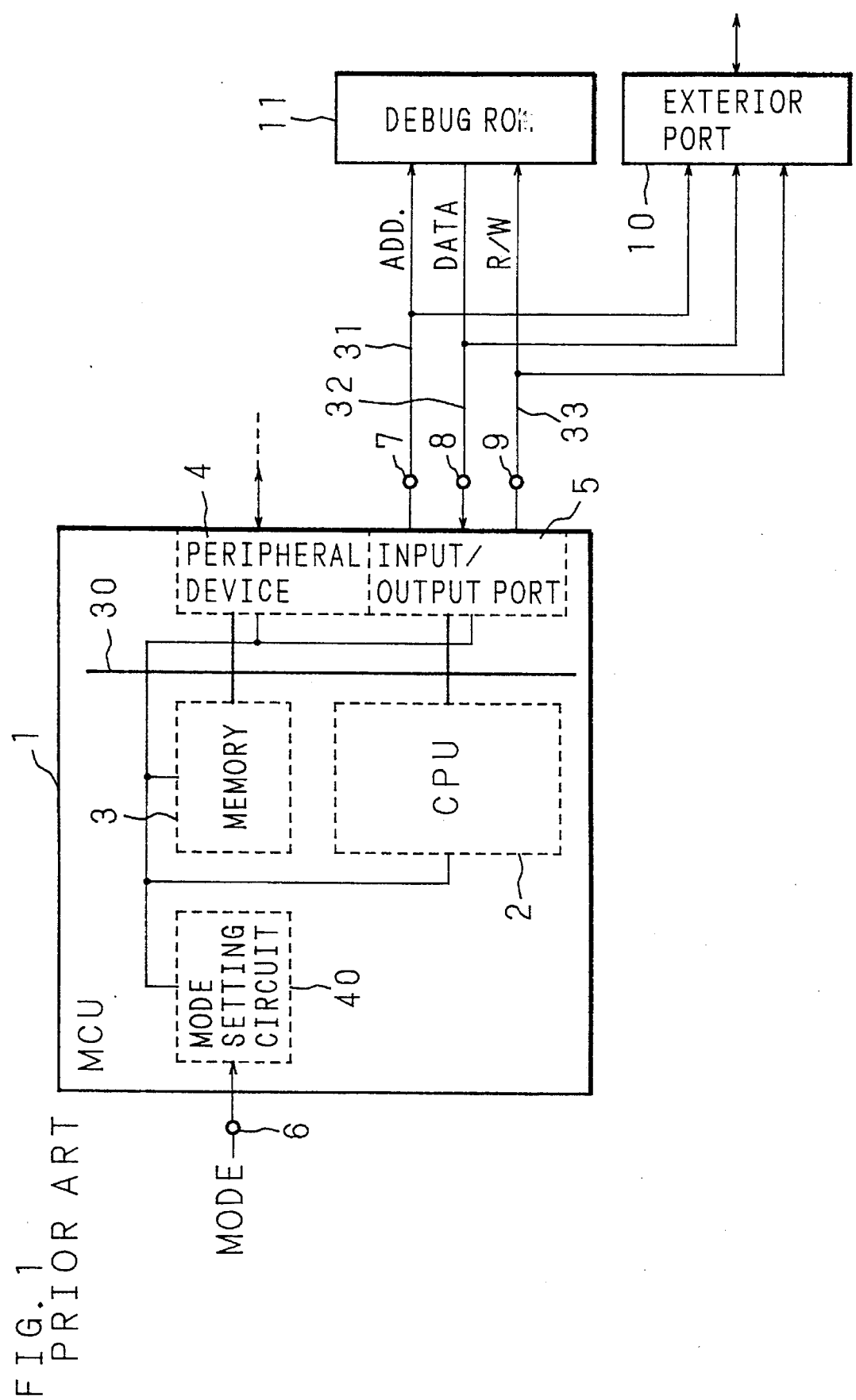
FIG. 1 is a schematic diagram showing a configuration of a conventional one-chip microcomputer.
Figure 2:
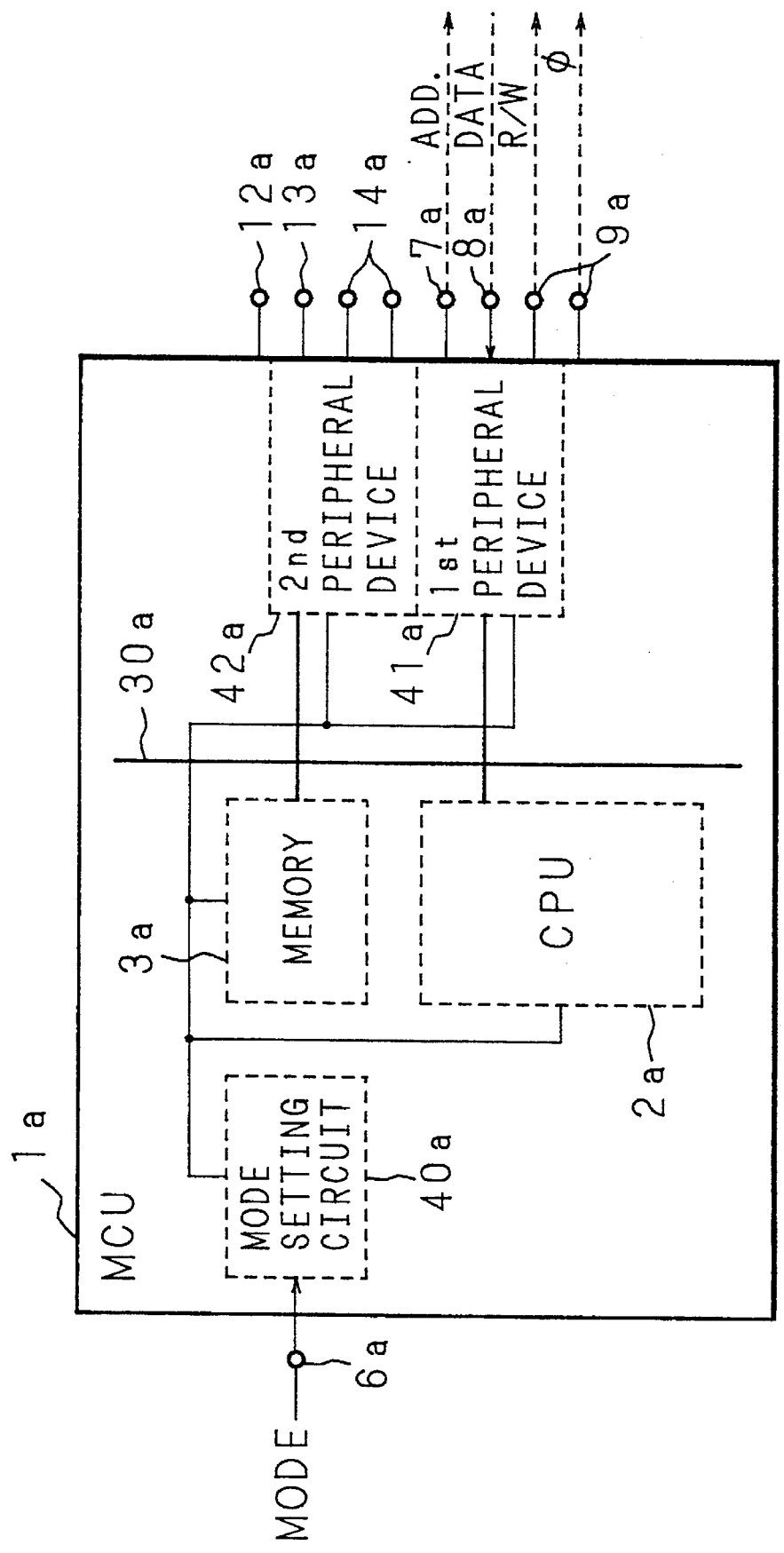
FIG. 2 is a schematic diagram showing a configuration of a first embodiment of a one-chip microcomputer of the present invention of the first example.

FIG. 2 is a schematic diagram showing the configuration of a first embodiment of a one-chip microcomputer of the present invention in the first example for controlling the other devices.

In FIG. 2, reference numeral 1a indicates a one-chip microcomputer (MCU) related to the present invention. Reference numerals 2a, 3a, 41a and 42a indicate the components thereof.

Concretely, reference numerals 2a, 3a, 41a and 42a indicate a CPU for executing a program, a memory storing the program, a first peripheral device such as A/D converter, timer or input/output port, and a second peripheral device, respectively. The first peripheral device 41a is provided with input/output terminals 7a, 8a and 9a for inputting/outputting signal from/to the outside, and the second peripheral device 42a is provided with input/output terminals 12a, 13a and 14a for the same.

Reference numeral 30a indicates an internal bus (including an address bus, a data bus and a control signal line) connecting the CPU 2a, the memory 3a, the first peripheral device 41a and the second peripheral device 42a to each other in the one-chip microcomputer 1a. Normally (under a normal operation mode described later), the first peripheral device 41a and the second peripheral device 42a are connected to the pertinent portions of the other devices which are controlled by the one-chip microcomputer 1a related to the present invention.

Since the programs and data for the one-chip microcomputer 1a related to the present invention are stored in the memory 3a, the one-chip microcomputer 1a has a first evaluation operation mode and a second evaluation operation mode which are different from ordinary operation modes in order to develop and evaluate the programs while operating the devices to be controlled with one-chip microcomputer 1a connected. The normal operation mode of one-chip microcomputer 1a related to the present invention is that, the CPU 2a is operated by the programs and data stored in the memory 3a of the one-chip microcomputer 1a and the operations thereof can not seen from the outside of the one-chip microcomputer 1a.

Reference numeral 40a indicates a mode setting circuit for switching the above stated operation modes. In response to a mode signal MODE inputted to the mode setting circuit 40a, the one-chip microcomputer 1a related to the present invention operates in either the normal operation mode above stated, the first evaluation operation mode or the second evaluation operation mode. Concretely, when the mode signal MODE is inputted via mode control terminal 6a, the mode setting circuit. 40a outputs signals to operate or stop each component in the one-chip microcomputer 1a related to the present invention in response to the specified mode.

When the normal operation mode is set, the mode setting circuit 40a operates all the components of the one-chip microcomputer 1a related to the present invention. However, when the first evaluation operation mode is set, the mode setting circuit 40a inhibits operations of the memory 3a and the first peripheral device 41a in the one-chip microcomputer 1a related to the present invention but makes the CPU 2a and the second peripheral device 42a operates. In this case, the CPU 2 operates by reading a program from the outside. When the second evaluation operation mode is set, the mode setting circuit 40a inhibits operations of the CPU 2a, the memory 3a and the second peripheral device 42a in the one-chip microcomputer 1a related to the present invention. In this case, the first peripheral device 41a is controlled by the outside.

In FIG. 2, reference numerals 7a, 8a and 9a indicate an address terminal, a data terminal and a control terminal as input/output terminals, respectively of first peripheral device 41a. When the normal operation mode is set, these input/output terminals 7a, 8a and 9a function as the input/output terminals of the first peripheral device 41a, however when the first evaluation operation mode under which the first peripheral device 41a does not operate is set, they function simply as the terminals for connecting the internal bus 30a to the outside. In this case, the address terminal 7a is connected to the internal bus of the one-chip microcomputer 1a related to the present invention, the data terminal 8a is connected to the internal address bus of the same, the control terminal 9a is connected to the control signal lines such as an R/W (read/write) or a φ (clock), respectively.

In FIG. 2, reference numerals 12a, 13a and 14a indicate input/output terminals of the second peripheral device 42a. When the normal operation mode is set, these terminals 12a, 13a and 14a function as the input/output terminals of the second peripheral device 42a, however when the second evaluation operation mode under which the second peripheral device 42a does not operate is set, they function simply as the terminals for connecting internal bus 30a to the outside. In this case, the address terminal 12a is connected to the internal address bus of the one-chip microcomputer 1a related to the present invention, the data terminal 13a is connected to the internal bus of the same, and the control terminal 14a is connected to the control signal lines such as the R/W (read/write) line or the φ (clock) respectively.

As stated above, the one-chip microcomputer 1a related to the present invention is equivalent to an exterior peripheral device having the equal functions to the first peripheral device 41a when the second evaluation operation mode under which the CPU 2a, the memory 3a and the second peripheral device 42a in the one-chip microcomputer 1a do not operate is set. Therefore, an exterior peripheral device having the equal functions to the first peripheral device 41a is not necessary for evaluation.

Next, a program development/evaluation system for the one-chip microcomputer, configured as stated above, of the first embodiment of the present invention is explained as follows.

Figure 3:
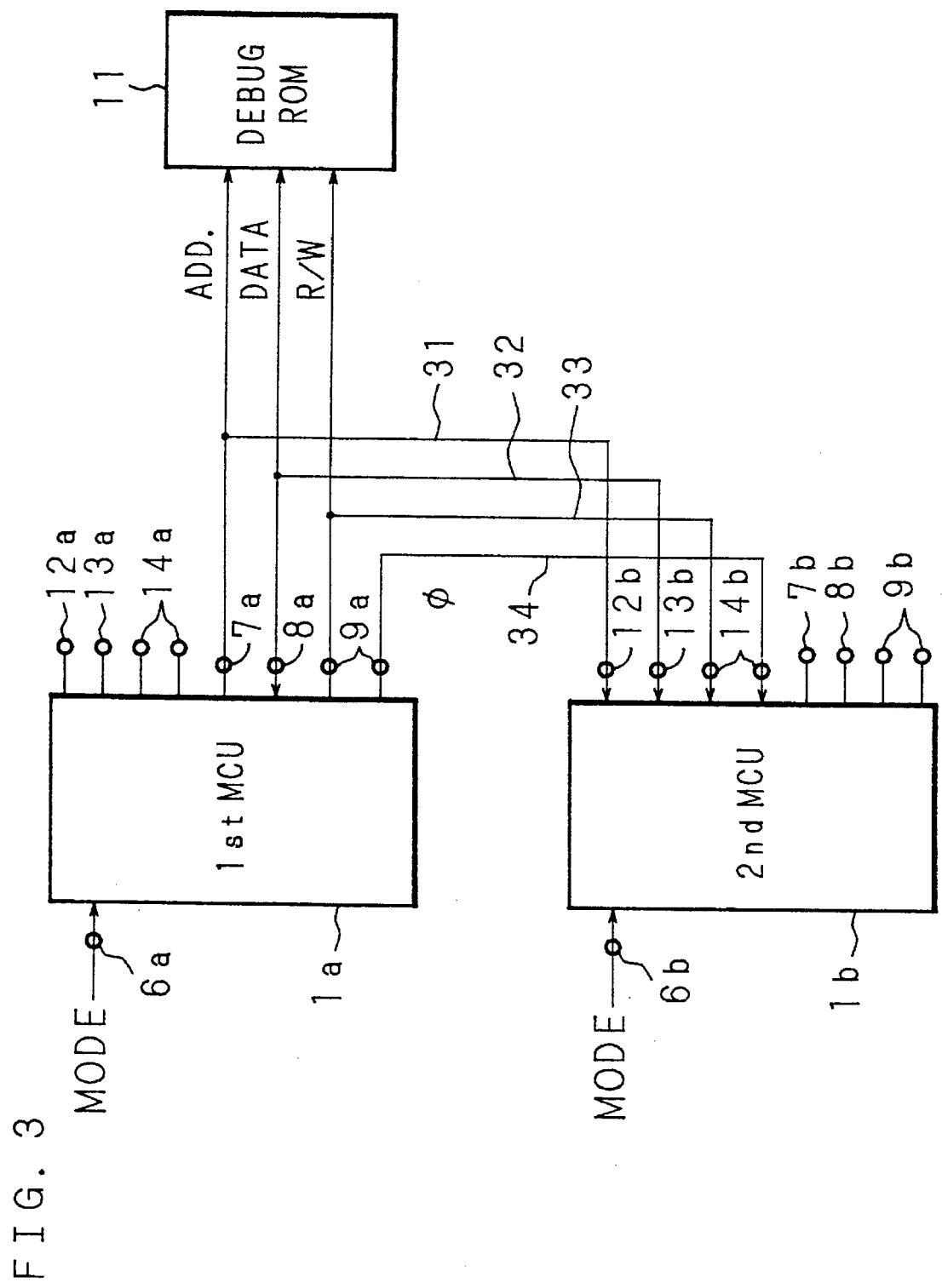
FIG. 3 is a schematic diagram showing a configuration of the program development/evaluation system for the one-chip microcomputer of an embodiment of the present invention of a first example.

FIG. 3 is a schematic diagram showing the configuration of the program development/evaluation system for the one-chip microcomputer 1a of the first embodiment of the present invention illustrated in FIG. 2.

In FIG. 3, reference numeral 1a indicates the one-chip microcomputer which is the first embodiment of the present invention shown in FIG. 2, and reference numeral 1b indicates a one-chip microcomputer equivalent thereto. In the descriptions hereafter, the one-chip microcomputer 1a is termed as a first MCU 1a and the one-chip microcomputer 1b is termed as a second MCU 1b. Further, a suffix "b" is annexed instead of "a" to the corresponding portions of the second MCU 1b to those of the first MCU 1a. Thus, additional explanation is omitted.

The internal configuration of the first MCU 1a is not described here as it is illustrated in FIG. 2. The internal configuration of the second MCU 1b is identical to that of the first MCU 1a, therefore explanation is omitted. The functions of the input/output terminals 7a, 8a and 9a of the first peripheral device 41a and the input/output terminals 12a, 13a and 14a of the second peripheral, device 42a of the first MCU 1a are identical to the contents illustrated in FIG. 2. Further, the functions of the input/output terminals 7b, 8b and 9b of the first peripheral device 41b and the of input/output terminals 12b, 13b and 14b of the second peripheral device 42b of the second MCU 1b are identical to those of the input/output terminals 7a, 8a and 9a, and 12a, 13a and 14a, respectively, of the first MCU 1a as a matter of course.

In FIG. 3, reference numeral 11 indicates a debug ROM as supplying means for the programs and data.

In FIG. 3, each input/output terminal of the first peripheral device 41a of the first MCU 1a is connected to each of the second peripheral device 42b of the second MCU 1b. Concretely, the address terminal 7a of the first peripheral device 41a of the first MCU 1a is connected to the address terminal 12b of the second peripheral device 42b of the second MCU 1b via the signal line 31, the data terminal 8a of the first peripheral device 41a of the first MCU 1a is connected to the data terminal 13b of the second peripheral device 42b of the second MCU 1b via the signal line 32, and the control terminal 9a of the first peripheral device 41a of the first MCU 1a is connected to the control terminal 14b of the second peripheral device 42b of the second MCU 1b via the signal line 33 for the R/W and via a signal line 34 for the φ. Further, the signal lines 31, 32 and 33 are connected to the debug ROM 11.

In the configuration shown in FIG. 3, when an appropriate mode signal MODE is inputted to the mode control terminal 6a of the first MCU 1a and the mode control terminal 6b of the second MCU 1b, the first MCU 1a operates under the first evaluation operation mode and the second MCU 1b operates under the second evaluation operation mode. Thus a system comprising the CPU 2a and second peripheral device 42a of the first MCU 1a, the first peripheral device 41b of the second MCU 1b and the debug ROM 11 is equivalent to a one-chip microcomputer under the normal operation mode as a whole for the devices to be controlled.

Consequently, the contents of the debug ROM 11 can be rewritten at any time and the operations of the CPU 2a of the first MCU 1a can be detected by the status of the signal lines 31, 32, 33 and 34 connected to the input/output terminals 7a, 8a and 9a. Therefore the program can be developed and evaluated while operating the devices to be controlled.

Next, a second embodiment of the present invention is described as follows.

Figure 4:
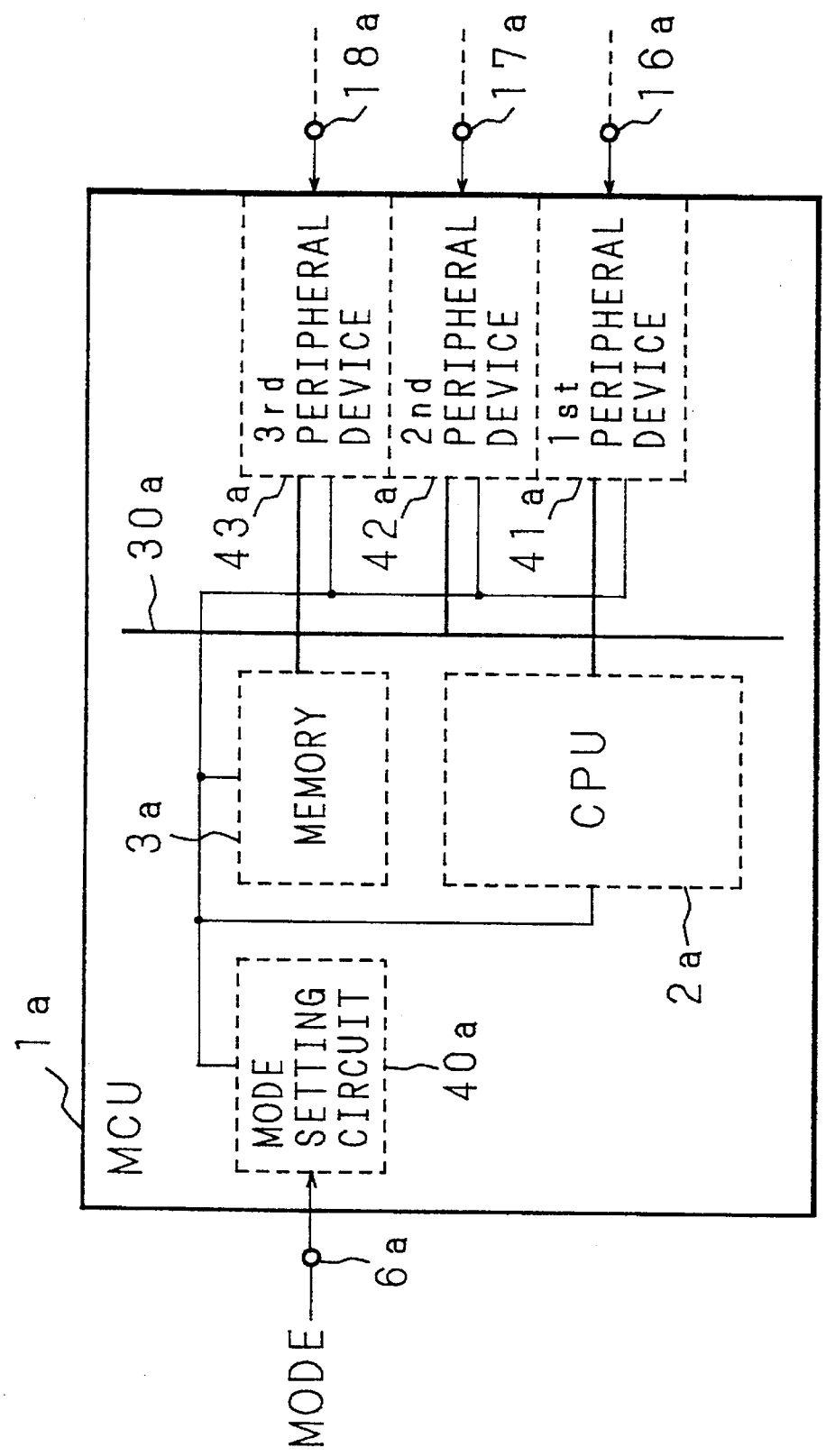
FIG. 4 is a schematic diagram showing a configuration of a second embodiment of a one-chip microcomputer of the present invention of a second example.

FIG. 4 is a schematic diagram showing a one-chip microcomputer, for controlling the other devices, which is the second embodiment of the present invention.

In the above mentioned first example, one-chip microcomputer 1a related to the present invention has the first peripheral device 41a and the second peripheral device 42a. In the second embodiment, the one-chip microcomputer 1a related to the present invention having more peripheral devices is described. In an example of the embodiment of the present invention shown in FIG. 4, the one-chip microcomputer 1a has three peripheral devices: a first peripheral device 41a, a second peripheral device 42a and a third peripheral device 43a.

In the second embodiment shown in FIG. 4, the one-chip microcomputer 1a related to the present invention has the third peripheral device 43a in addition to the components as same as the first embodiment shown in FIG. 2.

Reference numeral 16a collectively indicates input/output terminals 7a, 7b and 7c of the first peripheral device 41a. Reference numeral 17a collectively indicates input/output terminals 12a, 13a and 14a of the second peripheral device 42a. Reference numeral 18a indicates input/output terminals of the third peripheral device 43a corresponding to the input/output terminals 16a of the first peripheral device 41a and the input/output terminals 17a of the second peripheral device 42a.

The operation mode of the one-chip microcomputer 1a of the second embodiment is specified by the mode signal MODE inputted to the mode setting circuit 40a via the mode control terminal 6a in the same manner as in the first embodiment described above. In the second embodiment, as same as in the first embodiment, either the normal operation mode, first evaluation operation mode or second evaluation operation mode can be specified. In addition to these modes, in the second embodiment, a second evaluation operation mode A and a second evaluation operation mode B can be specified as the second evaluation operation mode therein.

When the first evaluation operation mode is set, the mode setting circuit 40a inhibits the memory 3a, the first peripheral device 41a and the second peripheral device 42a, in the one-chip microcomputer 1a related to the present invention from operating. In this case, the input/output terminals 16a of the first peripheral device 41a and the input/output terminals 17a of the second peripheral device 42a function simply as the terminals for connecting the internal bus 30a of the one-chip microcomputer 1a related to the present invention to the outside, and the CPU 2a and the third peripheral device 43a operate.

When the second evaluation operation mode A is set, the mode setting circuit 40a inhibits CPU 2a, the memory 3a, the first peripheral device 41a and the third peripheral device 43a in the one-chip microcomputer 1a related to the present invention from operating. In this case, the input/output terminals 16a of the first peripheral device 41a and the input/output terminals 18a of the third peripheral device 43a function simply as the terminals for connecting the internal bus 30a of the one-chip microcomputer 1a related to the present invention to the outside, and the second peripheral device 42a operates.

When the second evaluation operation mode B is set, the mode setting circuit 40a inhibits the CPU 2a, the memory 3a, the second peripheral device 42a and the third peripheral device 43a in the one-chip microcomputer 1a related to the present invention from operating. In this case, the input/output terminals 17a of the second peripheral device 42a and the input/output terminals 18a of the third peripheral device 43a function simply as the terminals for connecting the internal bus 30a of the one-chip microcomputer 1a related to the present invention to the outside, and the first peripheral device 41a operates.

When the second evaluation operation mode A wherein the CPU 2a, the memory 3a, the first peripheral device 41a and the third peripheral device 43a in the one-chip microcomputer 1a do not operate is set, the one-chip microcomputer 1a of the second embodiment of the present invention configured as stated above is equivalent to an exterior peripheral device having the equivalent functions to those of the second peripheral device 42a. When the second evaluation operation mode B wherein the CPU 2a, the memory 3a, the second peripheral device 42a and the third peripheral device 43a in the one-chip microcomputer 1a do not operate is set, the one-chip microcomputer 1a is equivalent to an exterior peripheral device having functions identical to those of the first peripheral device 41a. Consequently, an exterior peripheral device having equivalent functions to those of the first peripheral device 41a or the second peripheral device 42a is not necessary for evaluation.

The one-chip microcomputer 1a of the second embodiment of the present invention shown in FIG. 4 has the three peripheral devices 41a, 42a and 43a, and input/output terminals of the two peripheral devices thereof are used as those for connecting the internal bus 30a in the one-chip microcomputer 1a to the outside. This means that two-thirds of the input/output terminals of the three peripheral devices in the one-chip microcomputer 1a are occupied. Consequently, the second embodiment has an advantage wherein the entire number of the input/output terminals can be decreased when the bit width of the internal bus 30a is large.

When the one-chip microcomputer 1a has four or more peripheral devices, the present invention can be applied in case either one of the peripheral devices is made operable under the condition in which the second evaluation operation mode is set in the same manner as explained in the above second embodiment.

Figure 5:
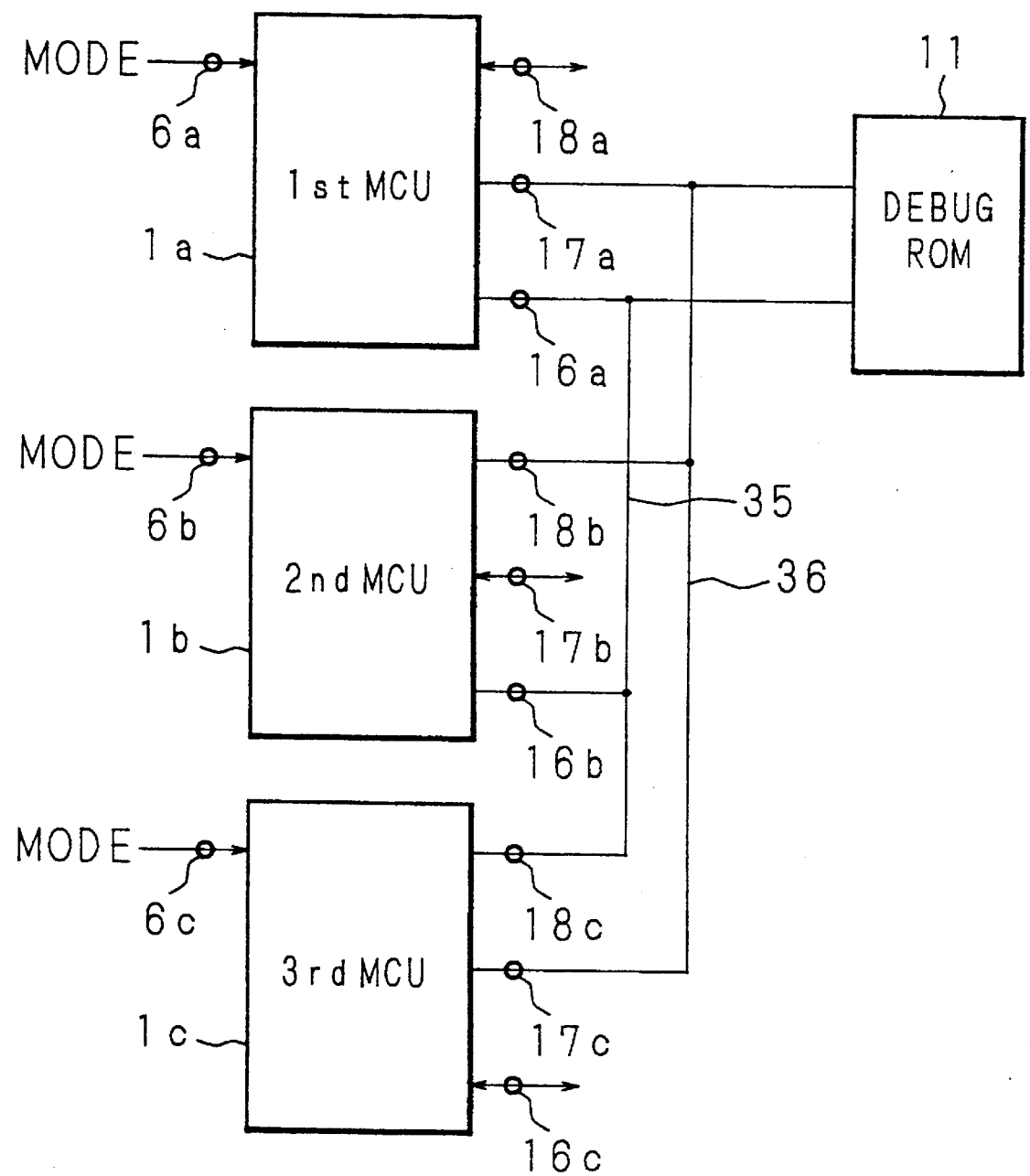
FIG. 5 is a schematic diagram showing a configuration of the program development/evaluation system for the one-chip microcomputer of an embodiment of the present invention of a second example.

FIG. 5 is a schematic diagram showing a configuration of a program development/evaluation system for one-chip microcomputer 1a which is the second embodiment of the present invention shown in FIG. 4.

In FIG. 5, reference numeral 1a indicates the one-chip microcomputer of the second embodiment of the present invention shown in FIG. 4. Reference numerals 1b and 1c indicate one-chip microcomputers equivalent to it. In the descriptions hereafter, the one-chip microcomputer 1a is termed as a first MCU 1a, the one-chip microcomputer 1b is termed as a second MCU 1b, and the one-chip microcomputer 1c is termed as a third MCU 1c. Further, suffix "b" or "c" is annexed instead of "a" to the corresponding portions of the second MCU 1b and the third MCU 1c to those of the first MCU 1a; thus additional explanation is omitted.

The internal configuration of the first MCU 1a is not described here as it is shown in FIG. 4. The internal configurations of the second MCU 1b and the third MCU 1c are not explained as they are identical to that of the first MCU 1a. The functions of the input/output terminals 16a of the first peripheral device 41a, the input/output terminals 17a of the second peripheral device 42a and the input/output terminals 18a of the third peripheral device 43a of the first MCU 1a are the same as those illustrated in FIG. 4. Furthermore, the input/output terminals 16b, 17b and 18b of the peripheral devices 41b, 42b and 43b of the second MCU 1b and the input/output terminals 16c, 17c and 18c of the peripheral devices 41c, 42c and 43c of the third MCU 1c has the same functions as those of the input/output terminals 16a, 17a and 18a, respectively, of the first MCU 1a as a matter of course.

In FIG. 5, reference numeral 11 indicates a debug ROM which supplies the programs and data.

In FIG. 5, the input/output terminals 16a of the first peripheral device 41a of the first MCU 1a are connected to the input/output terminals 16b of the first peripheral device 41b of the second MCU 1b and the input/output terminals 18c of the third peripheral device 43c of the third MCU 1c via signal lines 35. The input/output terminals 17a of the second peripheral device 42a of the first MCU 1a are connected to the input/output terminals 18b of the third peripheral device 43b of the second MCU 1b and the input/output terminals 17c of the second peripheral device 42c of the third MCU 1c via signal lines 36. The signal lines 35 and 36 are also connected to the debug ROM 11.

In the configuration shown in FIG. 5, by inputting appropriate mode signals MODE to the mode control terminal 6a of the first MCU 1a, the mode control terminal 6b of the second MCU 1b and the mode control terminal 6c of the third MCU 1c, respectively, the first MCU 1a operates in the first evaluation operation mode, the second MCU 1b operates in the second evaluation operation mode A and the third MCU 1c operates in the second evaluation operation mode B. Therefore, the system comprising the CPU 2a and the third peripheral device 43a of the first MCU 1a, the second peripheral device 42b of the second MCU 1b, the first peripheral device 41c of the third MCU 1c and the debug ROM 11 is equivalent to a one-chip microcomputer in the normal operation mode as a whole for the devices to be controlled.

Consequently, the contents of the debug ROM 11 can be rewritten. The operations of the CPU 2a of the first MCU 1a can be detected by the status of the signal lines 35 and 36 connected to the input/output terminals 16a and 17a, therefore programs can be developed and evaluated while operating the devices to be controlled.

In the above mentioned second embodiment, three peripheral devices: first, second and third are provided and there are two kinds of second evaluation operation modes: A and B. Four or more peripheral devices can be incorporated and there can be three or more second evaluation operation modes as a matter of course.

In each of the above stated embodiment, the input/output ports are regarded as peripheral devices.

As explained above, the one-chip microcomputer related to the present invention and the program development/evaluation system therefor eliminate an exterior peripheral device that is needed as a one-chip microcomputer which is equivalent to the one-chip microcomputer to be developed and evaluated, because the one-chip microcomputer can be used as the exterior peripheral device. Because the same number of the input/output port terminals as that of internal buses of the one-chip microcomputer is not necessary, a problem such that the one-chip microcomputer can not build in peripheral devices, which are properly built in, is solved.

As this invention may be embodied in several forms without departing from the spirit of essential characteristics thereof, the present embodiment is therefore illustrative and not restrictive, since the scope of the invention is defined by the appended claims, and all changes that fall within meets and bounds of the claims, or equivalents of such meets and bounds thereof are therefore intended to be embraced by the claims.

What is claimed is:

1. A one-chip microcomputer, comprising:

storing means for storing programs and data;

a CPU for executing the programs stored in said storing means;

a first peripheral device having terminals connected to the outside;

a second peripheral device having terminals connected to the outside; and operation mode setting means for setting either a first evaluation operation mode under which an operation of said storing means stops and the programs or data are read from the outside via the terminals of said first peripheral device in order to operate said CPU, or a second evaluation operation mode under which an operation of said CPU stops and signals are inputted/outputted from/to the outside via the terminals of said second peripheral device in order to control said first peripheral device.

2. A program development/evaluation system for a one-chip microcomputer, comprising:

a first, one-chip microcomputer, having;
    storing means for storing programs and data;
    a CPU for executing the programs stored in said storing means;
    a first peripheral device being provided with terminals connected to the outside;
    a second peripheral device being provided with terminals connected to the outside; and
    operation mode setting means for setting a first evaluation operation mode under which an operation of said storing means stops and the programs or data are read from the outside via the terminals of said first peripheral device in order to operate said CPU;

a second one-chip microcomputer, having;
    storing means for storing programs and data;
    a CPU for executing the programs stored in said storing means;
    a first peripheral device being provided with terminals connected to the outside;
    a second peripheral device being provided with terminals connected to the outside; and operation mode setting means for setting a second evaluation operation mode under which an operation of said CPU stops and signals are inputted/outputted from/to the outside via the terminals of said second peripheral device in order to control said first peripheral device; and program supplying means, which is connected to the terminals of said first, peripheral device of said first one-chip microcomputer;

wherein the terminals of said first peripheral device of said first one-chip microcomputer and terminals of said second peripheral device of said second one-chip microcomputer are connected with each other; and programs are developed and evaluated by a computer system comprising said CPU and said second peripheral device of said first one-chip microcomputer, said first peripheral device of said second one-chip microcomputer and said program supplying means.

3. A one-chip microcomputer, comprising:

storing means or storing programs and data;

a CPU for executing the programs stored in said storing means;

several peripheral devices each having terminals connected to the outside; and operation mode setting means for setting either a first evaluation operation mode under which an operation of said storing means stops and the programs or data are read from the outside via the terminals of some of said several peripheral devices in order to operate said CPU, or one or more second evaluation operation modes under which an operation of said CPU stops and, in order to control one peripheral device among said some of several peripheral devices, signals are inputted/outputted from/to the outside via the terminals of some of said several peripheral devices except for said one peripheral device.

4. A program development/evaluation system for one-chip microcomputer, comprising;

a first one-chip microcomputer, having:
storing means for storing programs and data;
a CPU for executing the programs stored in said storing means;
several peripheral devices each being provided with terminals connected to the outside; and
operation mode setting means for setting a first evaluation operation mode under which an operation of said storing means stops and the programs or data are read from the outside via the terminals of some of said several peripheral devices in order to operate said CPU;

a second one-chip microcomputer, having:
storing means for storing programs and data;
a CPU for executing the programs stored in said storing means;
several peripheral devices each being provided with terminals connected to the outside;
operation mode setting means for setting one or more second evaluation operation modes under which an operation of said CPU stops and, in order to control one peripheral device among the some of several peripheral devices, signals are inputted/outputted from/to the outside via the terminals of some of said several peripheral devices except for said one peripheral device; and program supplying means, which is connected to said some of peripheral devices of said first one-chip microcomputer;

wherein the terminals of some of peripheral devices of the first one-chip microcomputer for which said first evaluation operation mode is set are connected to the terminals of the peripheral devices except for one of said some of peripheral devices of said second one-chip microcomputer for which said second evaluation operation mode is set; and programs are developed and evaluated by a computer system comprising said CPU and some or all of peripheral devices except for said some other peripheral devices of said first one-chip microcomputer, some or all of peripheral devices which are not connected to said first one-chip microcomputer of said second one-chip microcomputers, and said program supplying means.

5. A one-chip microcomputer, comprising:

storing means for storing programs and data;

a CPU for executing the programs stored in said storing means;

first, second and third peripheral devices each having terminals connected to the outside; and operation mode setting means for setting either a normal operation mode, first evaluation operation mode or second evaluation operation mode, said second evaluation operation mode including a first evaluation operating mode and a second evaluation operating mode, wherein in the first evaluation operation mode, operation of said storing means, the first peripheral device and the second peripheral device are inhibited and programs and data are read from the outside via terminals of said first and second peripheral devices in order to operate said CPU, in the first evaluation operating mode of the second evaluation operation mode, operation of said storing means, said CPU, the first peripheral device and the third peripheral device are inhibited and signals are inputted/outputted from/to the outside via the inhibited first and third peripheral devices in order to control said second peripheral device, and in the second evaluation operating mode of the second evaluation operation mode, operation of said storing means, said CPU, the second peripheral device and the third peripheral device are inhibited and signals are inputted/outputted from/to the outside via the inhibited second and third peripheral devices in order to control said first peripheral device.

6. A one-chip microcomputer, comprising:

first one-chip microcomputer, having:
storing means for storing programs and data,
a CPU for executing the programs stored in said storing means,
first, second and third peripheral devices having terminals connected to the outside, and
operation mode setting means for setting a first evaluation operation mode under which an operation of said storing means and two of the peripheral devices are inhibited, and programs and data are read from the outside via the two inhibited peripheral devices in order to operate said CPU;

second one-chip microcomputer, having:
storing means for storing programs and data,
a CPU for executing the programs stored in said storing means,
first, second and third peripheral devices having terminals connected to the outside, and operation mode setting means for setting a first evaluation operating mode of a second evaluation operation mode under which an operation of said storing means, said CPU, and two of the peripheral devices are inhibited and signals are inputted/outputted from/to the outside via the terminals of the two inhibited the peripheral device in order to control said at least first, second and third peripheral devices which is not inhibited;

third one-chip microcomputer, having:
  storing means for storing programs and data,
  a CPU for executing the programs stored in said storing means,
  first, second and third peripheral devices having terminals connected to the outside, and
  operation mode setting means for setting a second evaluation operating mode of a second evaluation operation mode under which an operation of said storing means, said CPU, and two of the peripheral devices are inhibited and signals are inputted/outputted from/to the outside via the terminals of the two inhibited peripheral devices in order to control the peripheral device which is not inhibited; and program supplying means connected to the two inhibited two peripheral devices of each of said first, second and third one-chip microcomputers, wherein a different peripheral devices is not inhibited in each of the first, second and third one-chip microcomputers, and each inhibited peripheral device in any one one-chip microcomputer is connected to one inhibited peripheral device in each other one-chip microcomputer.

* * * * *